United States Patent
Wallace et al.

[19]

[11] Patent Number: 5,941,537
[45] Date of Patent: Aug. 24, 1999

[54] PRESSURE ACTUATED STATIC SEAL

[75] Inventors: Thomas T. Wallace, Maineville; Valentine R. Boehm, Jr., Cincinnati, both of Ohio

[73] Assignee: General Eletric Company, Cincinnati, Ohio

[21] Appl. No.: 08/923,916

[22] Filed: Sep. 5, 1997

[51] Int. Cl.$^6$ .................................................. F16J 15/02
[52] U.S. Cl. ........................ 277/642; 277/628; 415/174.1
[58] Field of Search .................. 277/628, 632, 277/637, 641, 642, 644, 925, 558; 415/115, 159, 160, 161, 162, 170.1, 174.1

[56] References Cited

U.S. PATENT DOCUMENTS

| | | | |
|---|---|---|---|
| Re. 19,910 | 3/1936 | Parker | 277/558 X |
| 2,614,793 | 10/1952 | Storm | 277/641 X |
| 3,381,988 | 5/1968 | Dewar | 277/642 X |
| 3,606,358 | 9/1971 | Tobler | 277/644 |
| 4,848,778 | 7/1989 | Von Pragenau | 277/644 |
| 4,897,020 | 1/1990 | Tonks | 415/115 |
| 5,324,165 | 6/1994 | Charbonnel et al. | 415/160 |
| 5,332,357 | 7/1994 | Tubbs | 415/160 |

OTHER PUBLICATIONS

GE, "CF6–80C2 HPT Rotor Seal," in production and public use more than one year prior to Sep. 5, 1997, single sheet.

*Primary Examiner*—Lynne A. Reichard
*Assistant Examiner*—Greg Binda
*Attorney, Agent, or Firm*—Andrew C. Hess; Rodney M. Young

[57] ABSTRACT

A static seal includes first and second spaced apart walls having a gap therebetween for channeling a pressurized fluid. The first wall includes a recessed seat facing the second wall defined by spaced apart first and second faces joined together at a base. A seal insert is loosely disposed in the seat and is trapped therein by the first and second faces. The first and second faces are shorter than the insert to project a top of the insert above the seat and below the second wall for initially promoting flow of the fluid over the insert top to deploy the insert in abutting contact with both the second face and the second wall to seal the gap.

20 Claims, 7 Drawing Sheets

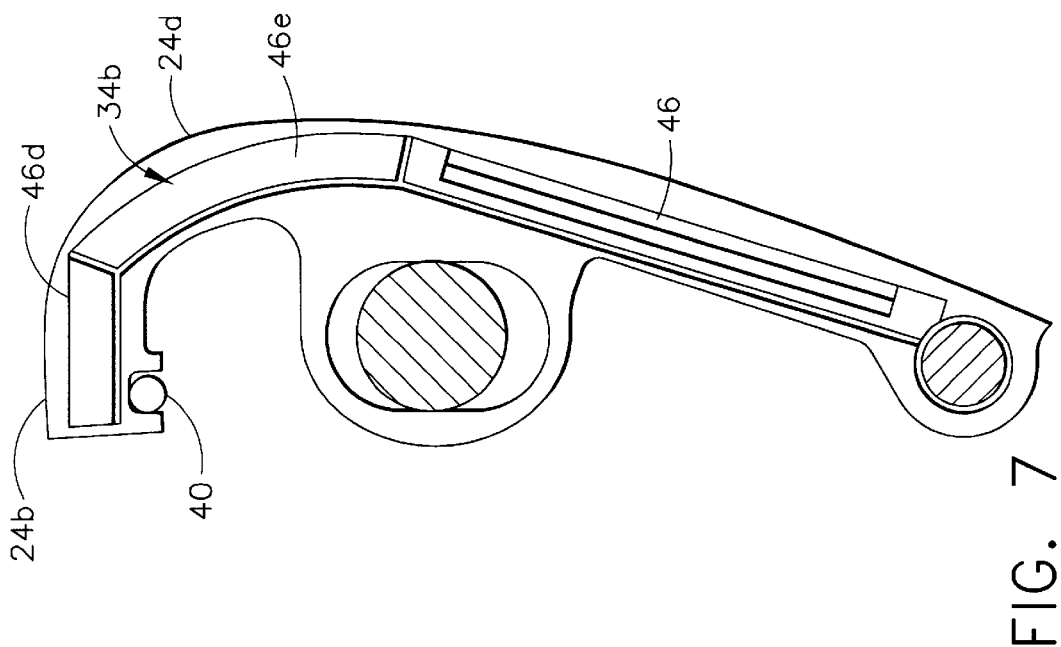
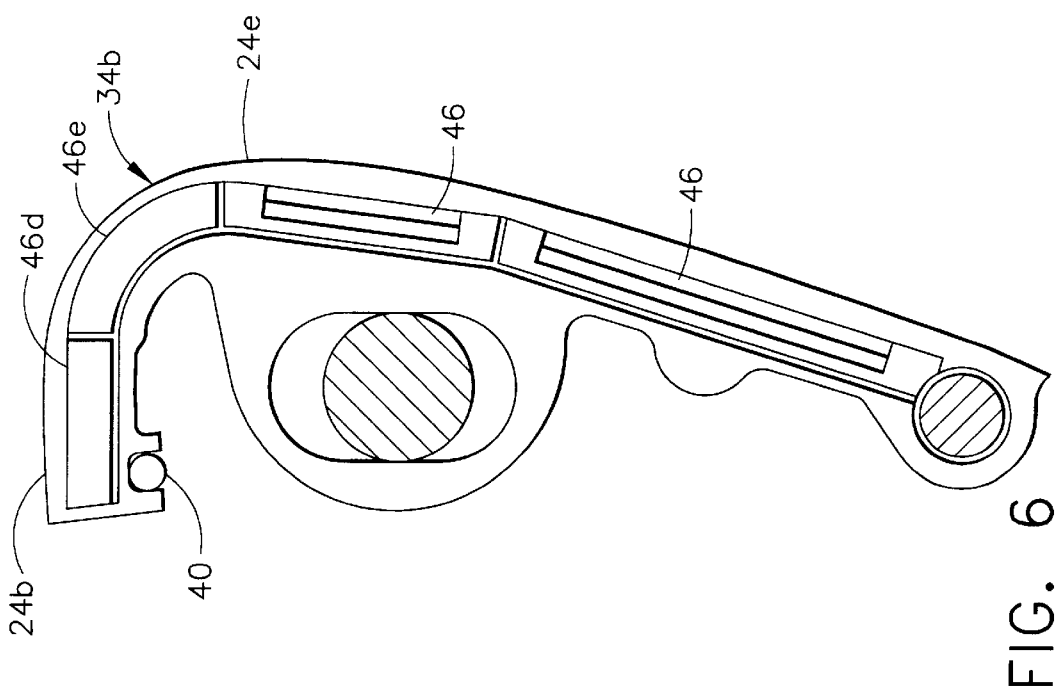

PRESSURE ACTUATED STATIC SEAL

The Government has rights to this invention pursuant to Contract Nos. F33615-92-C-2204 and F33615-95-C-2502, awarded by the Department of the Air Force.

CROSS REFERENCE TO RELATED APPLICATION

The present invention relates to U.S. patent application Ser. No. 08/919,520 filed Aug. 28, 1997, and entitled "Variable Area Turbine Nozzle".

BACKGROUND OF THE INVENTION

The present invention relates generally to gas turbine engines, and, more specifically, to turbine nozzles therein.

The core engine of a gas turbine engine typically includes a multistage axial compressor which provides compressed air to a combustor wherein it is mixed with fuel and ignited for generating hot combustion gas which flows downstream through a high pressure turbine nozzle and in turn through one or more stages of turbine rotor blades. The high pressure turbine blades are suitably joined to a rotor disk which is joined to the compressor by a corresponding drive shaft, with the turbine blades extracting energy for powering the compressor during operation in a two spool engine, a second shaft joins a fan upstream of the compressor to a low pressure turbine disposed downstream from the high pressure turbine for providing additional propulsion force for typical use in powering an aircraft in flight.

Typical turbine nozzles, such as high pressure and low pressure turbine nozzles, have fixed vane configurations and fixed nozzle throat areas there between in view of the severe temperature and high pressure loading environment in which they operate. The throat areas between adjacent nozzle vanes must be accurately maintained for maximizing performance of the engine, yet the hot thermal environment requires that the turbine nozzle be manufactured in circumferential segments for reducing thermal stress during operation. The nozzle segments therefore require suitable inter-segment sealing to reduce undesirable flow leakage, which further complicates turbine nozzle design.

Variable cycle engines are being developed for maximizing performance and efficiency over subsonic and supersonic flight conditions. Although it would be desirable to obtain variable flow through turbine nozzles by adjusting the throat areas thereof, previous attempts thereat have proved impractical in view of the severe operating environment of the nozzles. For example, it is common to provide variability in compressor stator vanes by mounting each vane on a radial spindle and collectively rotating each row of compressor vanes using an annular unison ring attached to corresponding lever arms joined to each of the spindles. In this way the entire compressor vane rotates or pivots about a radial axis, with suitable hub and tip clearances being required for permitting the vanes to pivot.

Applying the variable compressor configuration to a turbine nozzle has substantial disadvantages both in mechanical implementation as well as in aerodynamic performance. The severe temperature environment of the turbine nozzles being bathed in hot combustion gases from the combustor typically requires suitable cooling of the individual vanes, with corresponding large differential temperature gradients through the various components. A pivotable nozzle vane increases the difficulty of design, and also provides hub and tip gaps which require suitable sealing since any leakage of the combustion gas therethrough adversely affects engine performance and efficiency which negates the effectiveness of the variability being introduced.

In the related patent application identified above, an improved variable area turbine nozzle includes a plurality of stationary first vane segments which cooperate with complementary second vane segments which are pivotally joined to outer and inner bands to define respective two-piece vanes for adjusting throat area therebetween. The second vane segments are pivoted like doors relative to the corresponding first vane segments and therefore require suitable seals at their radial and axial ends to contain pressurized cooling air inside the individual vanes.

The present invention provides various forms of static seals therefor, which have additional utility wherever sealing is required between two spaced apart components subject to differential movement therebetween during operation.

SUMMARY OF THE INVENTION

A static seal includes first and second spaced apart walls having a gap therebetween for channeling a pressurized fluid. The first wall includes a recessed seat facing the second wall defined by spaced apart first and second faces joined together at a base. A seal insert is loosely disposed in the seat and is trapped therein by the first and second faces. The first and second faces are shorter than the insert to project a top of the insert above the seat and below the second wall for initially promoting flow of the fluid over the insert top to deploy the insert in abutting contact with both the second face and the second wall to seal the gap.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 6 is a top view of the second vane segment shown in FIG. 3 and taken along line 6—6 illustrating outer triangular end seals thereatop.

FIG. 7 is a bottom view of corresponding triangular end seals at the hub of the second vane segment illustrated in FIG. 3 and taken along line 7—7.

DESCRIPTION OF THE PREFERRED EMBODIMENT(S)

Figure 1:
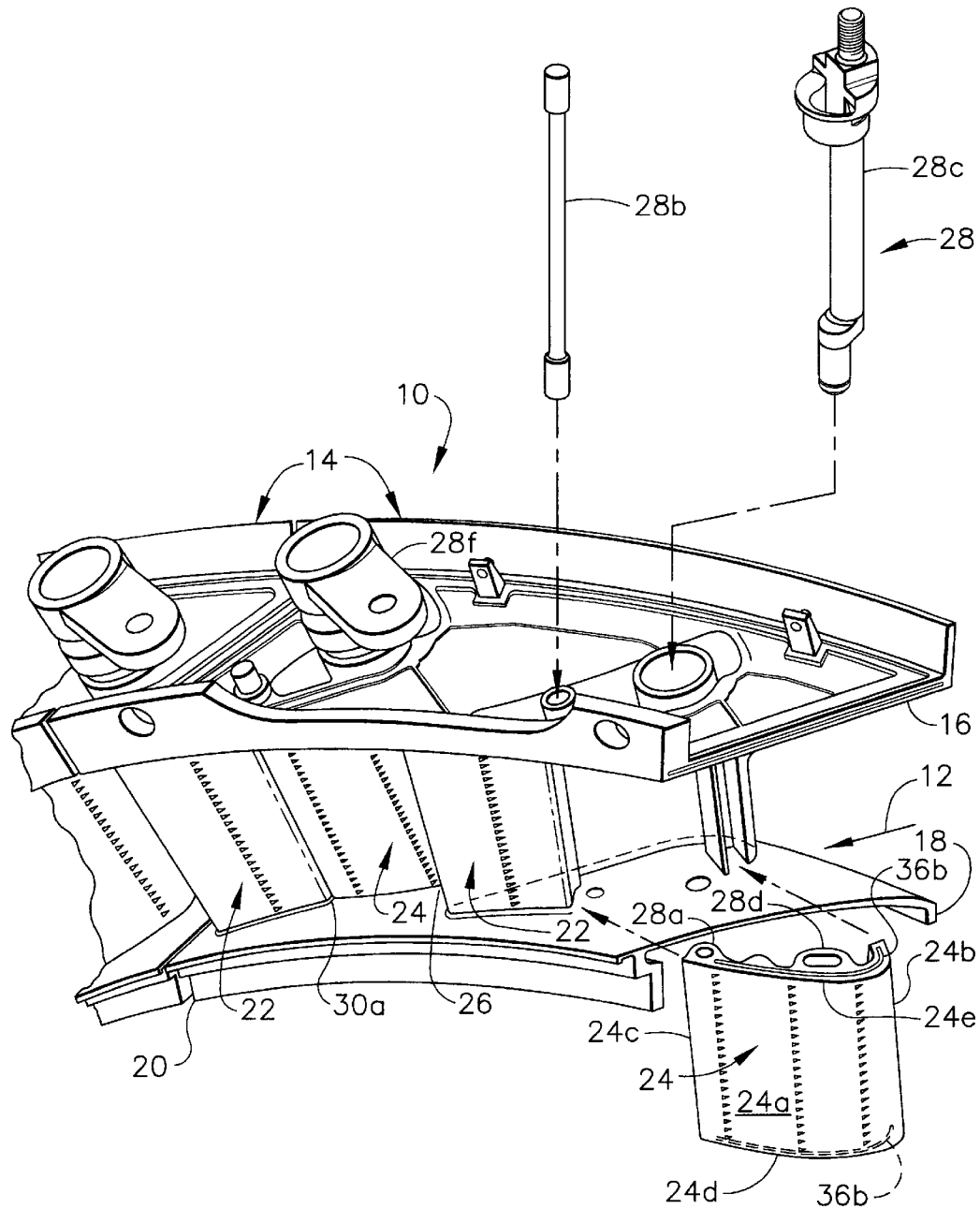
FIG. 1 is a partly exploded, isometric view of a portion of an exemplary gas turbine engine turbine nozzle having variable area nozzle segments sealed in accordance with an exemplary embodiment of the present invention.

Illustrated in FIG. 1 is a portion of a stator or static variable area turbine nozzle 10 configured as a high pressure turbine nozzle for firstly receiving high temperature combustion gas 12 from an annular combustor in a gas turbine engine (not shown). The gas turbine engine may be configured for powering an aircraft in flight over subsonic and supersonic flight speeds and includes a first spool or rotor having a compressor and cooperating high pressure turbine, and a second rotor or spool including a fan and low pressure turbine cooperating therewith (not shown).

The nozzle 10 is configured for providing variable area to selectively control the flow of the combustion gas 12 from the combustor to the rotor blades of the high pressure turbine. The variable area nozzle 10 is also referred to as a Controlled Area Turbine Nozzle (CATN).

In view of the severe temperature environment of the turbine nozzle 10 and the substantial aerodynamic and thermal loads accommodated thereby, the nozzle 10 is configured in a plurality of circumferentially adjoining nozzle segments 14 which collectively form a full, annular ring about the centerline axis of the engine.

Each nozzle segment 14 includes arcuate outer and inner bands 16, 18 radially spaced apart from each other. Circumferentially adjacent bands define split lines 20 which thermally uncouple the adjacent nozzle segments 14 from each other, and require conventional sealing therebetween using spline seals for example.

Each nozzle segment 14 preferably includes a plurality of circumferentially spaced apart first or stationary vane segments 22 extending radially, or longitudinally, between the outer and inner bands 16, 18, which are fixedly or integrally joined thereto in a one-piece box structure which may be formed conventionally as a single casting. In the exemplary embodiment illustrated in FIG. 1, two first vane segments 22 are joined to the common outer and inner bands, and provide a rigid structural assembly for accommodating thermal and aerodynamic loads during operation while providing a stationary reference for accurately effecting preferred flow areas as described hereinbelow.

Figure 2:
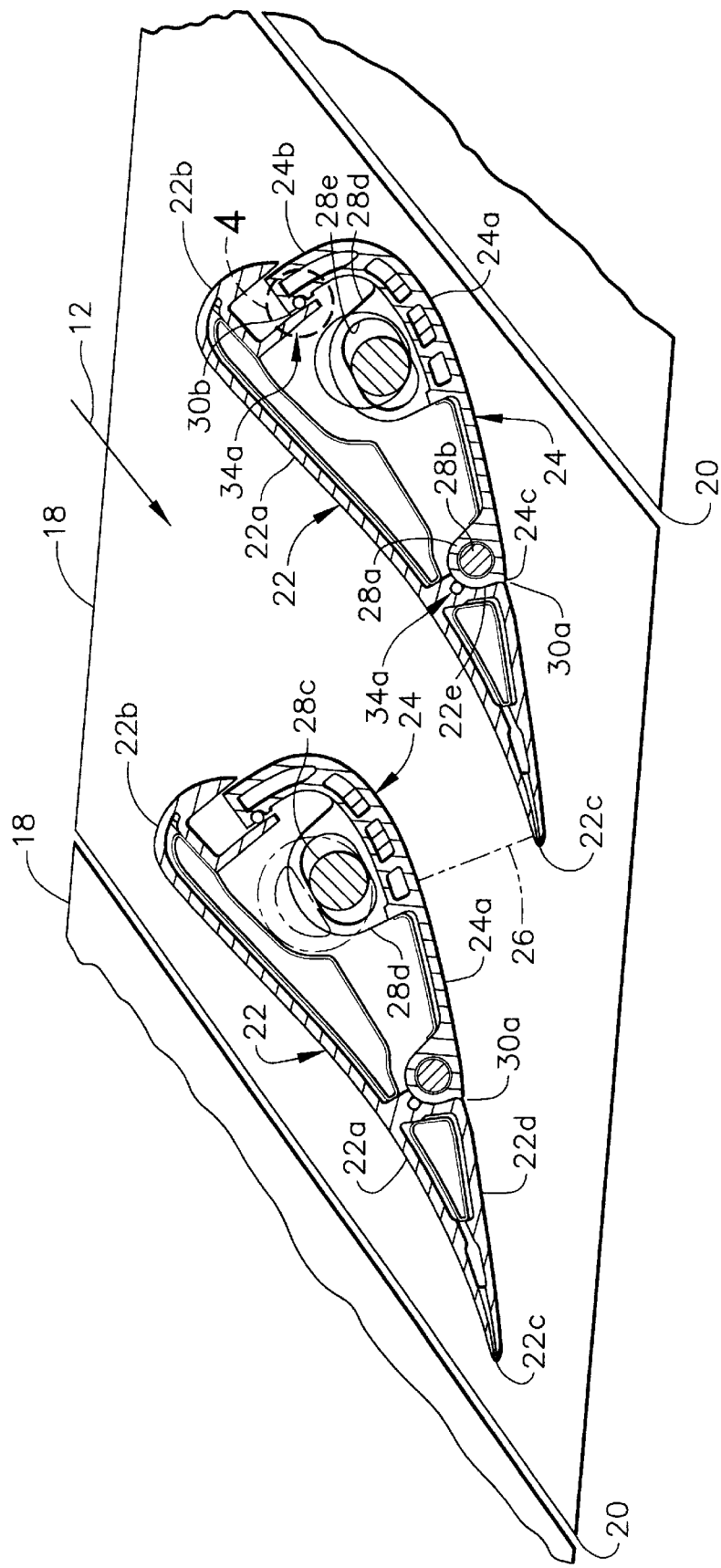
FIG. 2 is a top sectional view of one of the exemplary nozzle segments illustrated in FIG. 1 and taken generally along line 2—2 for showing two adjoining nozzle vanes for effecting variable area throats therebetween.

A plurality of pivotable or second vane segments 24 circumferentially adjoin respective ones of the first vane segments 22 to define therewith corresponding two-segment vanes as shown in more particularity in FIG. 2. In this exemplary embodiment, each of the first vane segments 22 is conventionally aerodynamically configured to define a concave or pressure sidewall 22a extending between a leading edge 22b and a trailing edge 22c.

Correspondingly, each of the second vane segments 24 is aerodynamically configured to define a portion of a convex or suction sidewall 24a extending between a first or forward end 24b and a second or aft end 24c spaced apart along the chord axis of the vanes. In the exemplary embodiment illustrated in FIG. 2, the second end 24c extends only part-chord between the leading and trailing edges 22b,c, with the sidewall 24a of the second vane segment 24 defining only a portion of the vane suction side. The remaining portion of the vane suction side is defined by a corresponding suction sidewall 22d of the first vane segment 22 extending from the trailing edge 22c.

In this way, the two first vane segments 22 between the leading and trailing edges 22b,c are fixedly joined in their entireties to both the outer and inner bands 16, 18 to create a four-piece rigid box structure to which the second vane segments 24 are suitably pivotally attached. This box structure provides structural rigidity for each nozzle segment 14 without any undesirable splitlines therein. The splitlines 20 are provided solely between the adjacent nozzle segments 14 in an otherwise conventional manner for accommodating differential thermal growth during operation.

The mounting arrangement of the first vane segments 22 also provides an inherent seal along the entire pressure sidewall 22a between the leading and trailing edges 22b,c to prevent undesirable crossflow of the combustion gas 12 past the individual vanes.

As shown in FIG. 2, the vanes are circumferentially spaced apart from each other to define corresponding throats 26 of minimum flow area, typically designated A4, for channeling therethrough the combustion gas 12 which in turn is received by the turbine rotor blades which extract energy therefrom in a conventional manner. Each throat 26 is defined by the minimum distance between the trailing edge 22c of one vane and a corresponding location on the suction sidewall 24a of the adjacent vane.

Figure 3:
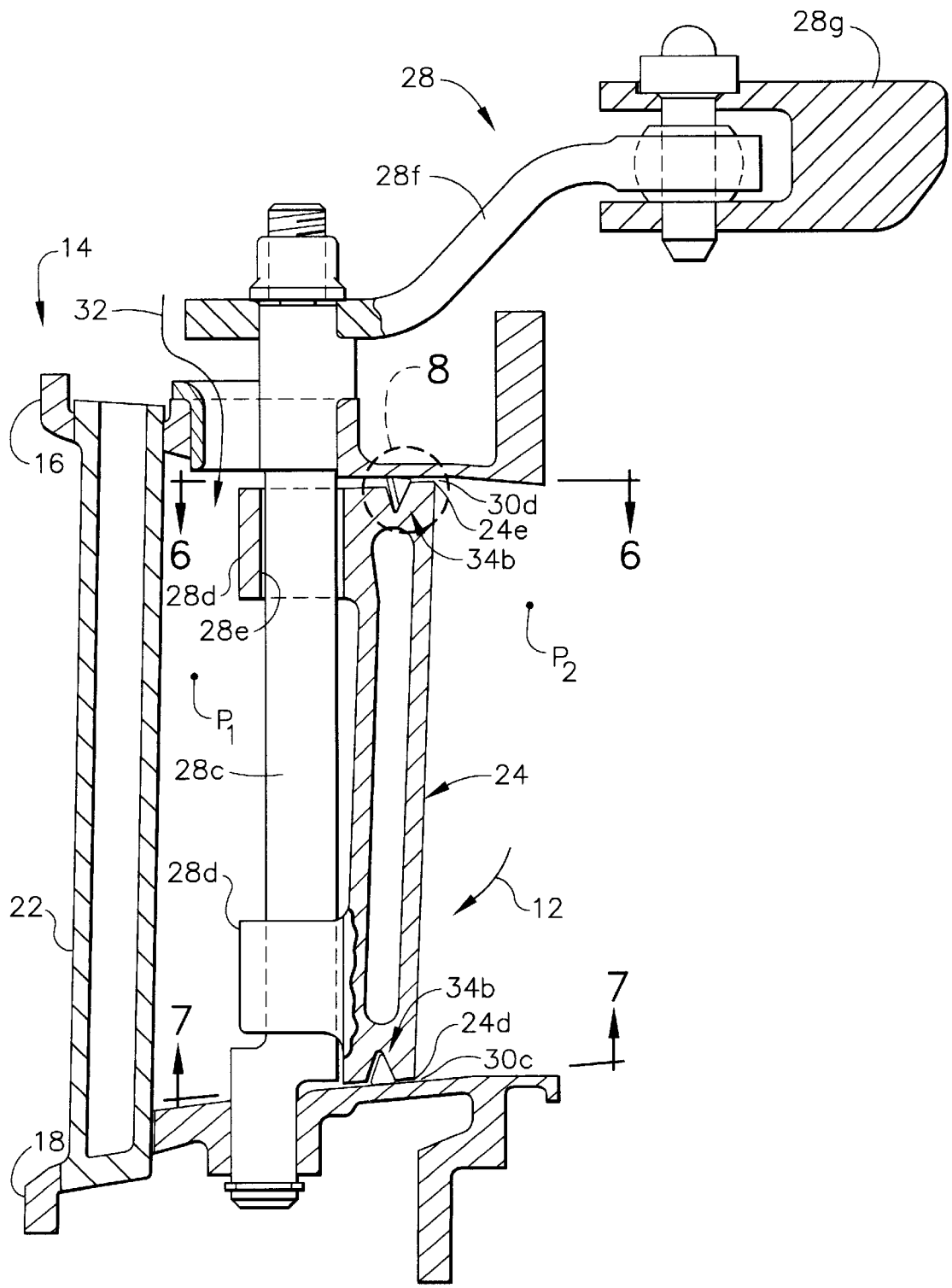
FIG. 3 is a partly sectional, elevational view through one of the variable area nozzle vanes illustrated in FIG. 1 and taken generally along line 3—3.

As illustrated in FIG. 3, means 28 are provided for pivoting each of the second vane segments 24 relative to its cooperating first vane segment 22 to selectively vary the individual throat areas 26 between the several vanes. Since the first vane segments 22 and the bands 16, 18 provide a rigid structure, the second vane segments 24 may be relatively simply mounted thereto for pivoting movement to provide controlled variable area capability. However, the individual second vane segments 24 must also be mounted to accommodate the substantial thermal and aerodynamic loads during operation without undesirable distortion which could adversely affect their movement, and without adversely affecting accurate control of the throat areas.

In the embodiment illustrated in FIGS. 1 and 2, the pivoting means 28 preferably include a corresponding hinge tube 28a integrally or fixedly joined to respective ones of the second vane segments 24 on the inside thereof at the aft end 24c, and defines a radial or longitudinal hinge gap 30a with a complementary hinge seat 22e integrally formed in the first vane segment 22.

A corresponding elongate hinge pin 28b extends radially through corresponding apertures in the outer and inner bands 16, 18 and respective ones of the hinge tubes 28a to pivotally mount each of the second vane segments 24 to the respective first vane segments 22 for pivoting movement relative thereto in the manner of a swinging door.

A respective actuation cam shaft 28c extends radially through corresponding apertures in the outer and inner bands 16, 18, and is operatively joined to respective ones of the second vane segments 24 to pivotally adjust the second vane segments to vary the throat area 26.

The cam shaft 28c may take various configurations to cooperate with the inside of the corresponding second vane segments 24 for pivoting thereof. As shown in more particularity in FIG. 3, each of the second vane segments 24 preferably includes a pair of longitudinally or radially spaced apart cam lugs 28d integrally or fixedly joined to the inside thereof. As shown more clearly in FIG. 2, each of the lugs 28d includes an oval slot 28e.

Correspondingly, the cam shaft 28c includes a radially offset cylindrical cam or lobe extending through the two lug slots 28e in a close lateral fit for pivoting the second vane segments 24 between expanded and contracted positions to correspondingly reduce and increase flow area of the throats 26 upon rotation of the cam shaft 28c. For example, FIG. 2 illustrates the second vane segments 24 pivoted to their maximum expanded or open position which in turn minimizes or closes flow area of the throat 26.

The preferred form of the cam shaft 28c is illustrated in more particularity in FIGS. 1 and 3. The intermediate portion of the cam shaft 28c defines a cylindrical cam lobe which engages the lugs 28d, with the outer and inner ends of the cam shaft 28c having suitable jogs terminating at bushings having a radial offset. The bushings engage complementary apertures in the outer and inner bands for rotating about a radial axis of rotation, with the centerline axis of the cam being offset therefrom. The outer end of the cam shaft 28c is suitably joined to a conventional lever 28f, which in turn is pivotally joined to an annular unison ring 28g in a manner similar to the actuation of conventional compressor stator vanes. Suitable actuators (not shown) rotate the unison ring 28g about the centerline axis of the engine to in-turn rotate the levers 28f which rotate the respective cam shafts 28c. The offset of the cam shaft 28c as illustrated in FIG. 2 causes relative movement laterally between the opposing first and second vane segments 22,24 to effect relative expansion and contraction therebetween.

In FIG. 2, the cam shaft 28c is rotated through its maximum lateral displacement from the first vane segment 22 to position the second vane segment 24 at its maximum expanded position to effect the minimum throat area. In the preferred embodiment illustrated in FIG. 2, the lug oval slots 28e have parallel flat sidewalls defining a minor axis of minimum length therebetween, and semicircular opposite sidewalls define therebetween a major axis of maximum length.

The minor axis is preferably disposed substantially parallel to the plane of the adjacent throat 26, with the major axis being generally parallel to the chord line extending between the leading and trailing edges 22b,c of the first vane segment 22 at the maximum expanded position. In the maximum expanded position illustrated in FIG. 2, the cam shaft 28c may be rotated a full 90° clockwise, for example, for contracting the second vane segment 24.

Since the nozzle segments 14 illustrated in FIG. 3 channel hot combustion gas 12 therethrough during operation, the vane segments may be suitably cooled using any conventional cooling technique including film and impingement cooling for example. In vane cooling, a portion of pressurized fluid or air 32 is suitably bled from the compressor (not shown) and channeled into the nozzle segments 14. The sidewalls of the first and second nozzle segments 22, 24 may be of a suitable double-wall construction for also channeling the pressurized air 32 therein for effecting suitable cooling thereof.

As shown in FIG. 3, the top bushing of the cam shaft 28c includes an aperture therethrough through which a portion of the pressurized air 32 may be channeled inside the hollow two-segment vane for internal cooling thereof. The pressure $P_1$ of the air 32 is substantially greater than the pressure $P_2$ of the combustion gas 12 which differential pressure is useful for self-deploying the second vane segments 24 into their maximum expanded positions.

Since the second vane segments 24 are relatively thin-walled members. They are subject to differential thermal and pressure loads during operation. Accordingly, the two lugs 28d illustrated in FIG. 3 are preferably spaced apart radially at opposite hub and tip ends of the second vane segments 24 to maximize the distance therebetween, and to maximize the reaction constraint on the second vane segments 24 at their hubs and tips. Since the second vane segments 24 define portions of the suction side of the individual vanes, they are highly loaded aerodynamically during operation and are restrained from outward deflection at the hub and tip by the respective lugs 28d which in turn transfer loads to the cam shaft 28c. This arrangement enhances flow area control without over-constraining the suction sidewall which could cause excessive thermal stress.

As indicated above, suitable means are provided for channeling the pressurized air 32 into the individual vanes defined by the complementary first and second vane segments 22, 24 for cooling thereof. Accordingly, suitable means are also required for sealing the second vane segments 24 to the outer and inner bands 16, 18 and to the first vane segments 22 at the hinge gaps 30a to confine the pressurized air inside the vanes upon pivoting travel of the second vane segments 24.

Since the individual second vane segments 24 pivot like doors relative to the cooperating first vane segments 22, they must be suitably sealed around their perimeters to prevent undesirable leakage of the pressurized air 32 from inside the vanes to outside the vanes. As shown in FIG. 2, the hinge gap 30a extends radially at the aft end 24c of the vane segment, and another radially extending forward gap 30b is located at the forward end 24b of the vane segment. In FIG. 3, an axial hub gap 30c is disposed at a hub 24d of the vane segment, and a tip gap 30d is disposed at a tip 24e of the vane segment. Due to the specific configuration of these various gaps 30a–d and the operating environment of the variable area nozzle 10, improved sealing thereat is required over available conventional sealing techniques and is the subject of the present invention.

More specifically, FIG. 2 illustrates a pair of stator or static wire seals 34a disposed at the two radial gaps 30a,b at the forward and aft ends 24b,c of the second vane segment for sealing the pressurized air 32 inside the vane. FIG. 3 illustrates a pair of triangular static seals 34b disposed at the hub and tip 24d,e of the second vane segments 24 to seal the corresponding gaps 30c,d to contain the pressurized air 32 inside the vane.

Figure 4:
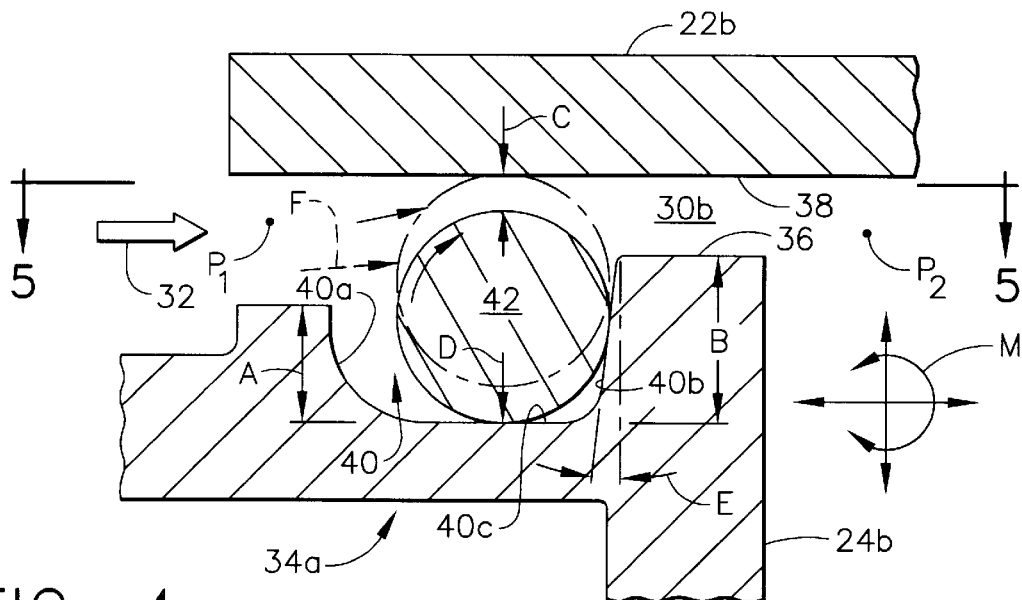
FIG. 4 is an enlarged sectional view of a static wire seal in accordance with an exemplary embodiment of the present invention disposed at the leading edge of first and second vane segments illustrated in FIG. 2 within the dashed circle labeled 4.
Figure 5:
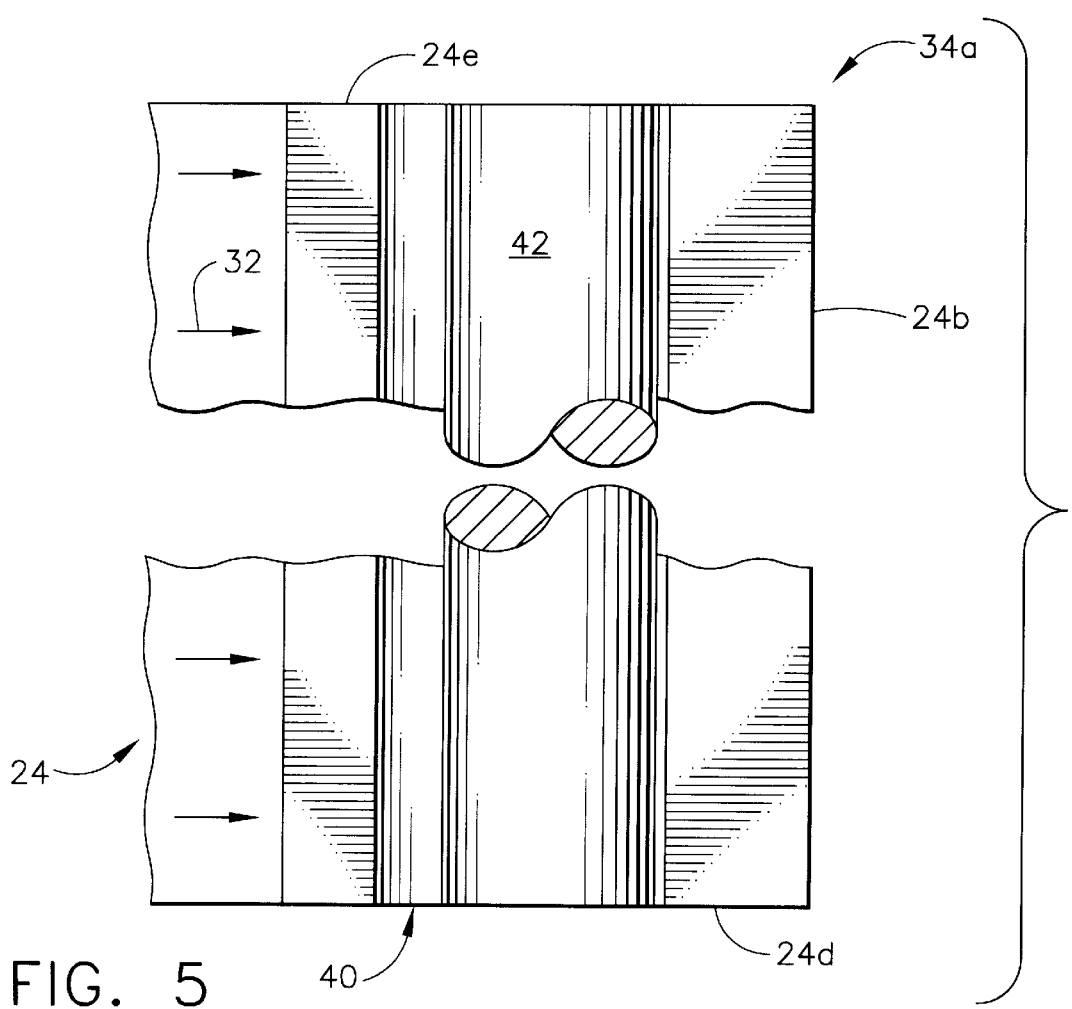
FIG. 5 is an elevational view of the wire seal illustrated in FIG. 4 and taken along line 5—5.

FIGS. 4 and 5 illustrate in more particularity the wire seal 34a disposed at the vane segment forward end 24b, with a similarly configured wire seal also being disposed at the vane segment aft end 24c. As shown in FIG. 4, the static wire seal 34a is an assembly of components including first and second laterally spaced apart stator walls 36, 38 having the forward gap 30b therebetween for channeling the pressurized air 32 therein. The first wall 36 includes a recessed seat 40 with its opened end facing outwardly toward the second wall 38. The seat 40 is defined by transversely spaced apart first and second faces 40a,b joined together at a common base 40c in a generally U-shaped profile.

A seal piece or insert 42 in the exemplary form of a cylindrical wire is loosely disposed to fit without attachment inside the seat 40, and is trapped transversely therein by the first and second faces 40a,b, and is trapped laterally between the second wall 38 and the base 40c. In accordance with the present invention, the first and second faces 40a,b are preferably shorter in height than the wire insert 42 to project a top portion of the insert above the seat 40 and into the gap 30b, and initially below the second wall 38 for initially promoting flow of the air 32 transversely through the gap 30b and over the insert top to aerodynamically lift or self-deploy the insert 42 in abutting sealing contact with both the second face 40b and the second wall 38, as shown in phantom line, to seal or plug the gap 30b.

The primary purpose of the seat first face 40a is to merely trap the insert 42 within the seat 40 with minimum pressure drop thereacross. The first seat 40a is therefore preferably shorter in height than the second face 40b with the former having a height A and the latter having a greater height B. The insert 42 has an initial spacing C between its top and the second wall 38 which is controlled by the diameter D of the insert 42 in the recess 40.

The pressure $P_1$ of the air 32 inside the vane is substantially greater than the pressure $P_2$ of the combustion gases outside the vane. This differential pressure acting across the wire seal 34a initially causes the air 32 to flow transversely over the insert 42 and through the gap 30b. Since the insert 42 is cylindrical or circular in section, its convex upper surface experiences aerodynamic lifting forces which move the insert 42 in abutting contact with the second wall 38. The first face 40a is therefore disposed upstream from the second face 40b and promotes pressure deployment of the insert 42 to seal the gap 30b irrespective of the orientation of the wire seal 34a in space. Deployment of the insert 42 is effected only by pressure forces from the pressurized air 32 which initially engage the insert 42 against the second wall 38 and maintain contact therewith by the resulting pressure force created by the differential pressure acting across the insert 42.

As shown in FIG. 5, the wire insert 42 is preferably straight, and is trapped in a complementary straight seat 40 which extends in the radial direction along the forward end 24b of the second vane segment 24. The seal first wall 36 is therefore a suitable portion of the second vane segment 24, and the seal second wall 38 is a suitable portion of the cooperating first vane segment 22 at its leading edge 22b. The straight insert 42 and cooperating seat 40 allows the insert 42 to roll about its centerline axis along the seat second face 40b to engage the second wall 38.

In the preferred embodiment illustrated in FIG. 4, the second face 40b is inclined aft in the downstream direction to allow the insert 42 to travel or roll aft and outward from the seat base 40c to engage the second wall 38 and seal the gap 30b. In a preferred embodiment, the second face 40b has an inclination angle E from the vertical or perpendicular between the first and second walls 36, 38 with a value up to about 10°. In this way, the insert 42 may roll upwardly along the inclined aft face 40b to reduce the magnitude of the differential pressure acting across the insert 42 required to self-deploy the insert 42 to seal the gap 30b.

The insert 42 has a suitable configuration such as the circular profile illustrated in FIG. 4 to engage or abut the second wall 38 along a contact line along the longitudinal or length direction of the insert 42 at its top, and to simultaneously engage the second face 40b therebelow towards the bottom of the insert. The insert 42 has a forward face extending between the two lines of contact against which the pressurized air 32 effects an aft directed engagement force F which keeps the insert 42 plugged in the gap 30b.

As shown in FIG. 4, a significant advantage of the wire seal 34a is its ability to self-deploy using differential pressure only, without any other deployment force. A conventional wire seal found in the gas turbine art is typically a 360° split ring which is attached to a rotor in the engine for using centrifugal force to expand the ring and effect sealing. Without centrifugal force, such a wire ring cannot deploy and seal. In contrast, the straight cylindrical insert 42 may have any orientation in space and is free to slide or roll in the seat 40 due to the aerodynamic deployment forces created by the initially escaping air. Once deployed, the insert 42 plugs the gap 30b providing an effective seal against further leakage therethrough. When the pressurized air 32 is removed, the insert 42 is allowed to return to its seat 40 until redeployed.

Another significant advantage of the self-deploying wire insert 42 illustrated in FIG. 4 is its ability to accommodate differential movement between the first and second walls 36, 38 during operation. As indicated above, the hostile operating environment of the turbine nozzle 10 includes differential movements of the components including the first and second walls 36, 38 which are readily accommodated by the loosely trapped wire insert 42. As shown in FIG. 4, the first and second walls 36, 38 are subject to differential lateral, transverse, and angular movements designated by the three double headed arrows collectively labeled M which are automatically accommodated by the insert 42. Since the insert 42 is loose in the seat 40, it is able to seal a range in magnitude of the gap 30b, as well as a range of differential orientations between the first and second walls 36, 38.

As illustrated in FIG. 2, substantially identical wire seals 34a may be used for suitably sealing the second vane segments 24 to the corresponding first vane segments 22 at the respective forward and aft ends 24b,c. As shown in FIG. 5, the wire insert 42 may expand a full radial height of the second vane segment 24 between its hub 24d and tip 24e for providing suitable sealing thereat.

Although the wire seal 34a could be configured with a segmented wire insert 42 for sealing the convex profile of the second vane segments 24 at their hub and tip 24d,e, different forms of the seals are preferably used as illustrated in FIG. 3 in the exemplary form of triangular end seals 34b. FIGS. 6 and 7 illustrate similar configurations of the end seals 34b, each having a plurality of triangular inserts aligned end-to-end along each of the radially inner hub end 24d of the second vane segments 24 and along the radially outer tip ends 24e thereof.

Figure 8:
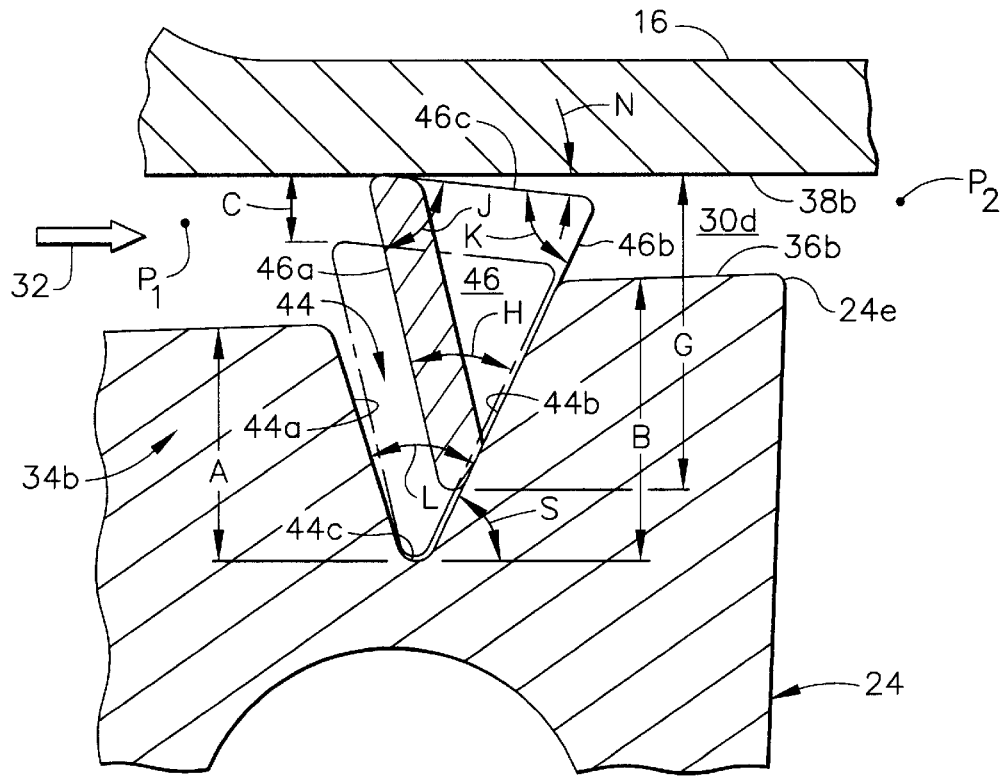
FIG. 8 is an enlarged elevational view of the outer end seal illustrated in FIG. 3 within the dashed circle labeled 8.
Figure 9:
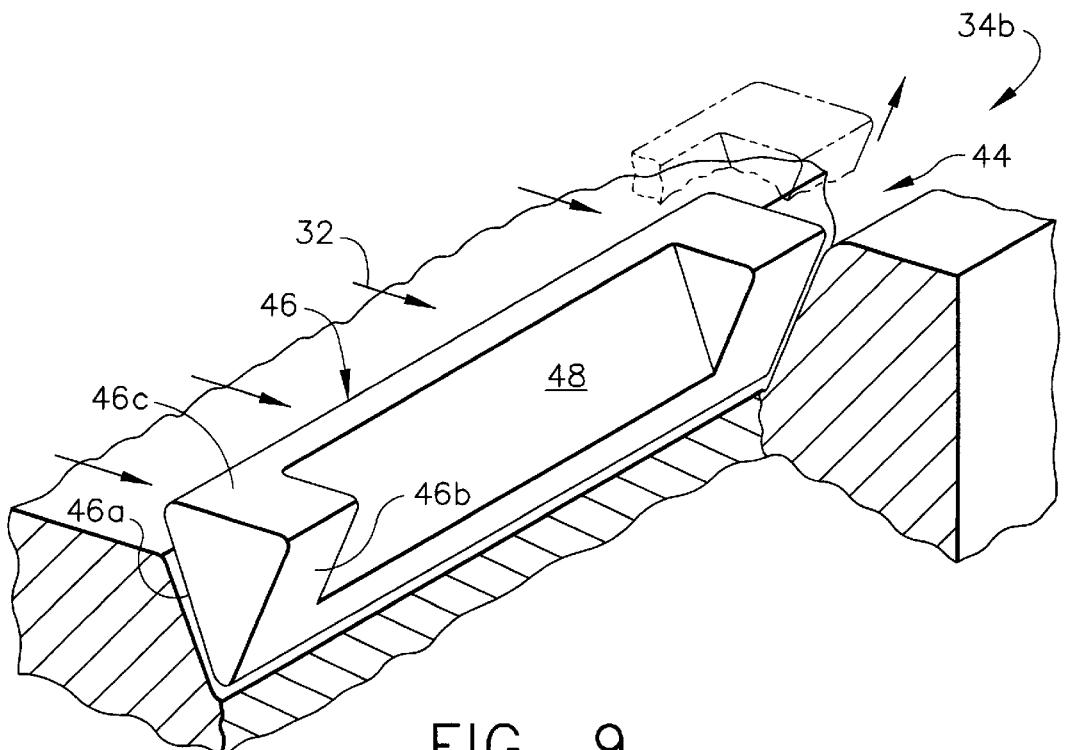
FIG. 9 is an isometric view of the end seal illustrated in FIG. 8 having a triangular scalloped seal insert.

The end seals 34b are illustrated in more particularity in FIGS. 8 and 9 for the vane tip, with a similar configuration being used for the vane hub as well. In the embodiment illustrated in FIG. 8, the first stator wall is designated 36b and is the outer surface of the vane tip 24e, and the stator second wall is designated 38b and is the inner surface of the outer band 16, with the tip gap 30d being defined therebetween. The seat is designated 44 and is generally V-shaped with a first or forward face 44a, a second or aft face 44b, and a base 44c extending therebetween.

The triangular insert is designated 46 and has a height G. As in the first embodiment disclosed above, the first and second faces 44a,b are preferably shorter in height than the insert 46, with the first face 44a being shorter than the second face 44b as disclosed above.

The triangular insert 46 includes a forward face 46a facing the seat forward face 44a, and an aft face 46b disposed atop the seat second face 44b and joining the forward face 46a at the insert bottom having an included corner angle H, preferably about 40°. The insert 46 also includes a top face 46c facing the second wall 38b and joining the forward and aft faces 46a,b at respective corner angles J, K, preferably about 70° for defining an isosceles triangle in the bottom corner.

Correspondingly, the seat 44 is complementary with the triangular insert 46 to limit contact between the insert 46 and the second wall 38b only at the insert forward corner at the forward and top faces 46a,c in the preferred embodiment. The seat 44 has an included spread angle L preferably about 42°, with the seat aft wall 44b being inclined at an angle S of about 64° from the horizontal as illustrated in FIG. 8. In this way, the top face 46c is inclined away from the second wall 38b during contact at the forward corner at a diverging inclination angle N which is sufficiently large to ensure contact only of the forward corner of the insert 46, with the angle N being preferably up to about 6°.

As illustrated in phantom line in FIG. 8 and in solid line in FIG. 9, the triangular insert 46 is initially resting in its seat 44, with the pressurized air 32 flowing through the tip gap 30d effecting aerodynamic self-deployment of the insert 46 which slides upwardly along the seat aft face 44b until the forward corner of the insert 46 contacts the second wall 38b along a contact line therewith. The differential pressure acting across the insert 46 both deploys the insert 46 and maintains the insert 46 in abutting contact with the seat aft face 44b and the second wall 38b during operation to provide an effective seal across the tip gap 30d. The diverging angle N of the insert top face 46c from its forward corner maximizes the effective pressure force acting across the insert forward face 46a for maintaining effective sealing. This configuration of the insert 46 in the seat 44 also provides stable operation without undesirable resonance of the insert 46 therein.

As indicated above, the triangular seals 34b may be similarly configured for sealing both the hub and tip ends 24d,e of the second vane segments to the corresponding inner and outer bands 18, 16. As shown in FIGS. 6 and 7, a plurality of the triangular inserts are preferably used in end-to-end alignment along each of the vane segments hubs and tips to better follow the rapidly changing convex profile of the second vane segments 24 and providing effective sealing therealong, as well as being simpler to manufacture.

FIGS. 8 and 9 illustrate a basic configuration of the triangular insert 46 which is straight along its length and is preferably scalloped along its aft face 46b to include a cut-out recess 48 for increasing bending flexibility along the forward face 46a, as well as reducing weight of the insert 46. The scalloped inserts 46 may be used in one or more segments as shown in FIGS. 6 and 7 along the convex second vane segment 24 in regions thereof subject to thermal distortion during operation. The scalloped recess 48 increases the flexibility of the insert 46 to flex during operation to conform with expected amounts of thermal distortion for maintaining effective sealing of the gaps.

Figure 10:
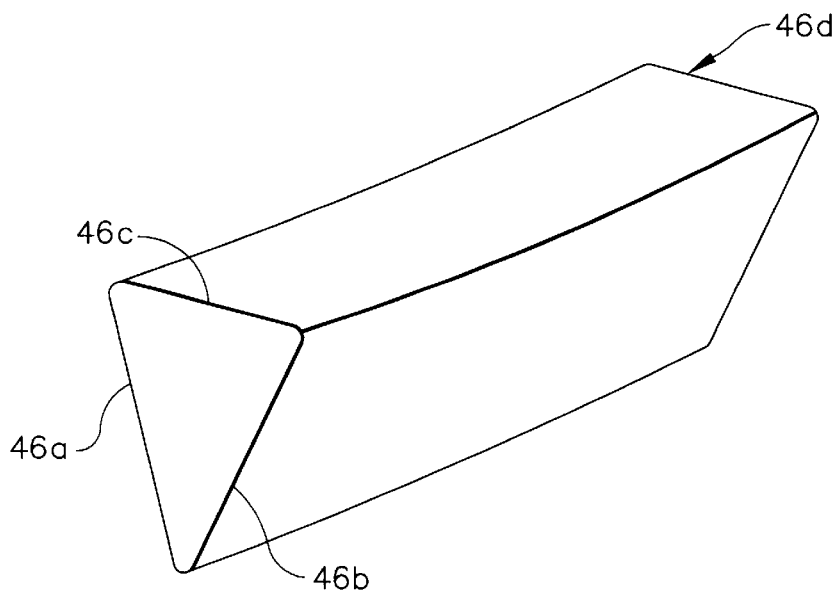
FIG. 10 is a triangular seal insert in solid form in accordance with another embodiment of the present invention.

Illustrated in more detail in FIG. 10 is another embodiment of the triangular seal designated 46d which is solid and straight, without the scalloped recess 48 in the previous embodiment, and which may be used to advantage near the forward end 24b of the second vane segments 24 which does not experience significant thermal distortion during operation.

Figure 11:
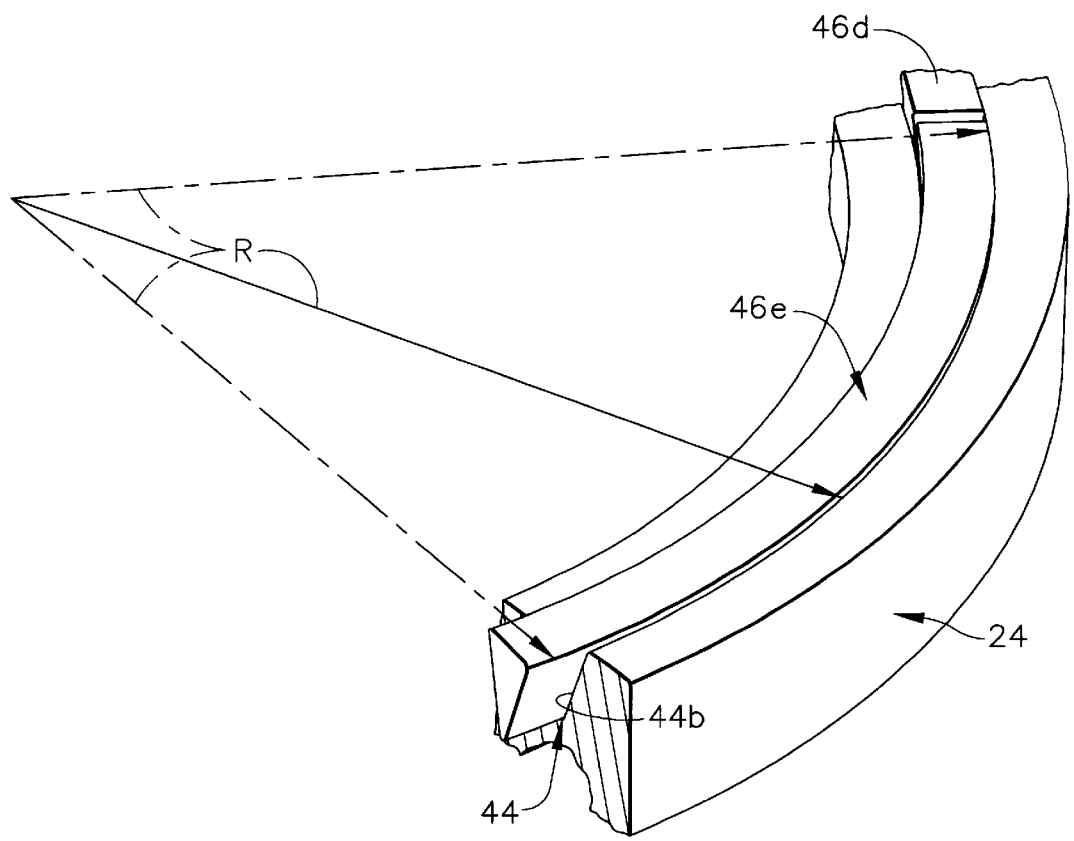
FIG. 11 is a triangular insert with a cylindrical profile along its length in accordance with another embodiment of the present invention.

Illustrated in FIG. 11 is another embodiment of the triangular insert designated 46e which is arcuate along its length, and has a preferably cylindrical profile with a constant radius of curvature R that is complementary to a substantially identical radius of curvature R of the seat 44 in the second vane segment 24. As shown in FIGS. 6 and 7, the cylindrical triangular inserts 46e are located at the maximum convex curvature of the hubs and tips of the second vane segments 24 to provide an effective seal thereat.

The inserts 46e and complementary seats 44 are preferably cylindrical to ensure that as the inserts 46 slide radially outwardly from their seats 44 along the respective aft faces 44b, substantially continuous contact is made between the insert 46e and the aft face 44b for maintaining effective sealing therealong. Since the seat 44 is generally V-shaped and follows the convex profile of the second vane segments 24, the seat aft face 44b is preferably cylindrical in space to maintain engagement along the length of the similarly convex or cylindrical triangular seal insert 46e therein.

The various embodiments of the seal inserts and seats therefor, may be specifically configured as described above for effectively sealing the various gaps around the perimeter of the second vane segments 24, especially during differential movement therebetween. As the second vane segments 24 are pivoted opened and closed, the respective seal inserts slide along the respective second walls 38, 38b for maintaining effective sealing. And, effective sealing is maintained even with thermal distortion between the first and second walls defining the sealed gaps. Since the radial profile of the second vane segments 24 is relatively straight, the relatively simple wire inserts 42 may be used therefor. Since the convex profile of the second vane segments. 24 at their hubs and tips 24d,e is relatively complex, the triangular inserts 46 may be tailored for providing effective sealing thereat as described above. Preferably, the second wall 38b is a flat surface over the range of travel of the triangular seal inserts 46 for better maintaining sealing contact therebetween.

In both general embodiments of the static seals, the differential pressure of the pressurized air 32 relative to the combustion gases 12 provides self-deployment of the respective inserts using aerodynamic lifting or pressure forces, or both. Once engaged, the respective seal inserts are maintained in place by the differential pressure force acting thereon which provides stability of operation without undesirable resonance thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A static seal for sealing a pressurized fluid in a gas turbine engine comprising:

first and second spaced apart walls having a gap therebetween for channeling said fluid;

said first wall including a recessed seat facing said second wall and defined by spaced apart first and second faces joined together at a base;

a seal insert loosely disposed in said seat and trapped therein by said first and second faces; and said first and second faces being shorter than said insert to project a top of said insert above said seat and below said second wall for initially promoting flow of said fluid over said insert to deploy said insert in abutting contact with both said second face and said second wall to seal said gap.

2. A seal according to claim 1 wherein said first face is shorter than said second face and is disposed upstream therefrom to reduce flow restriction of said fluid thereat and promote pressure deployment of said insert to seal said gap.

3. A seal according to claim 2 wherein said second face is inclined aft to allow said insert to travel aft and outward from said seat to engage said second wall and seal said gap.

4. A seal according to claim 3 wherein said insert is configured to engage said second wall along a contact line at said insert top, and to engage said second face therebelow, with said insert having a forward face extending therebetween against which said pressurized fluid effects an engagement force.

5. A seal according to claim 4 wherein said insert is a cylindrical wire.

6. A seal according to claim 5 wherein said wire insert is straight, and said seat is straight for allowing said insert to roll along said second face to engage said second wall.

7. A seal according to claim 6 in combination with:
a first vane segment extending between outer and inner bands fixedly joined thereto;
a second vane segment adjoining said first vane segment to define a corresponding nozzle vane, and pivotally joined to said outer and inner bands to vary profile of said vane;
means for channeling pressurized air into said vane as said pressurized fluid; and wherein
said static seal first wall extends radially along said second vane segment;
said static seal second wall extends radially along said first vane segment; and
said wire insert extends radially between said first and second walls to seal said pressurized air inside said vane.

8. A seal according to claim 4 wherein said insert is a triangular rod.

9. A seal according to claim 8 wherein:
said triangular insert further includes an aft face disposed atop said seat second face and joining said forward face at an insert bottom, and a top face facing said second wall and joining said forward and aft faces; and
said seat is complementary with said triangular insert to limit contact of said insert and second wall only at a corner of said forward and top faces.

10. A seal according to claim 9 in combination with:
a first vane segment extending between outer and inner bands fixedly joined thereto;
a second vane segment adjoining said first vane segment to define a corresponding nozzle vane, and pivotally joined to said outer and inner bands to vary profile of said vane;
means for channeling pressurized air into said vane as said pressurized fluid; and wherein
said static seal first wall is disposed along both radially inner and outer ends of said second vane segment;
said static seal second wall is disposed along both said outer and inner bands; and
respective ones of said triangular inserts are disposed between said second vane segment and said outer and inner bands to seal said pressurized air inside said vane.

11. An apparatus according to claim 10 further comprising a plurality of said triangular inserts aligned end-to-end along each of said inner and outer ends of said second vane segment.

12. An apparatus according to claim 11 wherein said triangular inserts include straight and cylindrical inserts following a convex profile of said second vane segment.

13. A seal according to claim 9 wherein said triangular insert is straight.

14. A seal according to claim 9 wherein said triangular insert is arcuate.

15. A seal according to claim 9 wherein said triangular insert is cylindrical.

16. A seal according to claim 9 wherein said triangular insert is scalloped along said aft face to include a recess for increasing bending flexibility of said insert.

17. A seal according to claim 1 wherein said seal insert is elongate and extends in length between opposite ends thereof in said seat, and includes an aerodynamic upper surface for aerodynamically lifting said insert upon flow of said fluid through said gap to self-deploy said insert in abutting contact with said second wall.

18. A seal according to claim 17 wherein said insert is cylindrical.

19. A seal according to claim 17 wherein said insert upper surface is convex.

20. A seal according to claim 17 wherein said insert is triangular, with said upper surface being inclined.

* * * * *